United States Patent
Tujimoto et al.

(10) Patent No.: US 8,623,518 B2
(45) Date of Patent: Jan. 7, 2014

(54) COPPER-BASED SLIDING MATERIAL

(75) Inventors: Kentaro Tujimoto, Inuyama (JP); Kazuaki Toda, Inuyama (JP)

(73) Assignee: Daido Metal Company Ltd., Nagoya (JP)

(*) Notice: Subject to any disclaimer, the term of this patent is extended or adjusted under 35 U.S.C. 154(b) by 0 days.

(21) Appl. No.: 13/591,724

(22) Filed: Aug. 22, 2012

(65) Prior Publication Data

US 2013/0052480 A1    Feb. 28, 2013

(30) Foreign Application Priority Data

Aug. 30, 2011  (JP) ................. 2011-187885

(51) Int. Cl.
| B32B 15/04 | (2006.01) |
| B32B 15/18 | (2006.01) |
| B32B 15/20 | (2006.01) |
| F16J 15/00 | (2006.01) |
| F16C 33/02 | (2006.01) |

(52) U.S. Cl.
USPC ........... 428/677; 428/684; 428/704; 384/276; 277/653

(58) Field of Classification Search
USPC .......... 428/677, 674, 675, 676, 684, 685, 704
See application file for complete search history.

(56) References Cited

U.S. PATENT DOCUMENTS

2011/0206939 A1* 8/2011 Imai et al. .................... 428/553

FOREIGN PATENT DOCUMENTS

| EP | 0962541    | 12/1999 |
| GB | 2355016    | 4/2001  |
| GB | 2386610    | 9/2003  |
| GB | 2478069    | 8/2011  |
| JP | 04-028836  | 1/1992  |
| JP | 08-035026  | 2/1996  |
| JP | 11-124646  | 5/1999  |
| JP | 3370785    | 1/2003  |
| JP | 2003-269456| 9/2003  |
| JP | 2005-350722| 12/2005 |
| JP | 3839740    | 11/2006 |

OTHER PUBLICATIONS

European Search Report dated Oct. 29, 2012 in corresponding European patent application Serial No. EP 12181486.7 (5 pages).

* cited by examiner

*Primary Examiner* — Michael La Villa
(74) *Attorney, Agent, or Firm* — Harness, Dickey & Pierce, P.L.C.

(57) ABSTRACT

A copper-based sliding material including a steel back metal layer and a Cu alloy layer is provided. The Cu alloy layer contains 0.5 to 15 mass % of Sn, 0.2 to 5 mass % of inorganic compound particles and the balance being Cu and unavoidable impurities. The inorganic compound particles are dispersed in a Cu alloy matrix and have an average size of 1 to 10 μm. A ratio of a true density of the Cu alloy matrix in relation to that of the inorganic compound particles is 0.6 to 1.4 and a ratio of a thermal expansion coefficient of the Cu alloy matrix in relation to that of the inorganic compound particles is 1.5 to 3.0. An average distance between the inorganic compound particles dispersed in the Cu alloy matrix is 5 to 50 μm.

9 Claims, 3 Drawing Sheets

COPPER-BASED SLIDING MATERIAL

FIELD OF THE INVENTION

The present invention relates to a copper-based sliding material having excellent seizure resistance, and particularly relates to a copper-based sliding material suitable for a halved bearing, a bush and a thrust washer and the like of an automobile, an industrial machine and the like.

RELATED ART

Conventionally, a copper-based sliding material for a slide bearing for an internal combustion engine is generally manufactured with a continuous sintering method. This continuous sintering method includes continuously spreading a Cu alloy powder on a steel strip and continuously sintering and rolling the strip. In addition, for the copper-based sliding material for the slide bearing, there is proposed a sintered Cu alloy to which inorganic compound particles are added, in order to improve bearing characteristics, such as resistance to wear, seizure and corrosion (for instance, see JP-A-11-124646, JP-A-2005-350722, Japanese Patent No. 3839740 and Japanese Patent No. 3370785).

SUMMARY OF THE INVENTION

In recent years, a load applied to a slide bearing tends to increase along with a tendency that an automobile engine has a higher power. Thus, a sliding surface of the slide bearing and the surface of an opposing axis are brought into direct metal-to-metal contact with each other, and seizure tends to easily occur. The invention is made due to the above circumstances, and an object of the invention is to provide a copper-based sliding material including inorganic compound particles and having excellent seizure resistance.

In order to achieve the above object, the present invention provides a copper-based sliding material including a back metal layer made of steel and a Cu alloy layer containing 0.5 to 15 mass % of Sn, 0.2 to 5 mass % of inorganic compound particles and the balance of Cu and unavoidable impurities. The inorganic compound particles have an average particle diameter of 1 to 10 μm. A ratio of a true density of a Cu alloy matrix in relation to that of the inorganic compound particle satisfies 0.6 to 1.4 and a ratio of a thermal expansion coefficient of the Cu alloy matrix in relation to that of the inorganic compound particle satisfies 1.5 to 3.0. An average distance between the inorganic compound particles dispersed in the Cu alloy matrix is 5 to 50 μm.

According to an embodiment of the invention, the inorganic compound particles are one or more compounds of a metal carbide, a metal nitride, a metal silicide and a metal boride.

According to an embodiment of the invention, the Cu alloy layer further contains 0.1 to 30 mass % in total of one or more elements of the group of Bi and Pb.

According to an embodiment of the invention, the Cu alloy layer further contains 0.1 to 40 mass % in total of one or more elements of Ni, Zn, Fe, Ag and In.

According to an embodiment of the invention, the Cu alloy layer further contains 0.01 to 0.5 mass % P.

When a copper-based sliding material having the inorganic compound particles dispersed in the Cu alloy matrix is used e.g. as a slide bearing for an internal combustion engine, a temperature rise of the copper-based sliding material generates a defect (distortion) in an array of metal atoms constituting the Cu alloy matrix in a periphery of the inorganic compound particles, due to a difference of thermal expansion between the Cu alloy matrix and the inorganic compound particles. The Cu alloy matrix having the defect in the metal atoms array becomes active, and tends to easily cause a reaction with oxygen and sulfur in a lubricant oil. In the invention, a distance between the inorganic compound particles dispersed in the Cu alloy matrix is controlled in a range of 5 to 50 μm. Thereby, the whole Cu alloy matrix is affected by the difference of the thermal expansion between the Cu alloy matrix and the inorganic compound particles, and accordingly becomes a uniformly active state. Thus, an oxide film and a sulfide film can be early formed on the whole surface of the Cu alloy matrix. Thereby, the surface of the Cu alloy matrix and the surface of an opposing axis are prevented from direct contact with each other, and the seizure resistance can be improved.

It has been found out that the above distance between the inorganic compound particles dispersed in the Cu alloy matrix is affected by a dispersed state when the powder is spread. The distance can be controlled by a porosity of the Cu alloy powder, that is calculated from an expression of (1−bulk density/true density)×100 and by a ratio of a true density of the Cu alloy matrix in relation to that of the inorganic compound particles. When a Cu alloy powder produced by an atomization process is spread on a steel strip, voids exist among particles of the Cu alloy powder. When a mixed powder of the Cu alloy powder produced by the atomization process and the inorganic compound particles is spread on the steel strip, the inorganic compound particles exist in void among the Cu alloy powders. In general, the porosity is approximately 20 to 80%. However, when the porosity exceeds 70%, the inorganic compound particles tend to easily aggregate and segregate, and the average distance between the inorganic compound particles becomes excessively large. On the other hand, the inorganic compound particles dispersed uniformly as the porosity is smaller. However, it is necessary to use a Cu alloy powder manufactured by a special method to control the porosity to less than 20%, and accordingly the copper-based sliding material becomes expensive.

The inventors considered that a distance between of inorganic compound particles in an Cu alloy matrix after sintered would become constant if the Cu alloy powder having a smaller average particle size and having a narrow distribution of the particle size is mixed with the inorganic compound particles. Although they tested, a variation of the particles distance of the inorganic compound particles was large, and it was difficult to control the distance. This is considered as follows. Even if the Cu alloy powder and the inorganic compound particles are uniformly dispersed when the powder is mixed, the Cu alloy powder having the small average particle size and the narrow particle size distribution has a large porosity. In addition, the powder obtained by mixing the Cu alloy powder with the inorganic compound particles has poor flowability. Accordingly, the inorganic compound particles are aggregated and segregated in a step of spreading on the band steel.

The reason of the limitation in the invention is described below.

(1) Sn Content

A Cu alloy matrix of a copper-based sliding material contains Sn in general, in order to improve strength of the Cu alloy matrix. When the Sn content is less than 0.5 mass %, an effect of improving the strength of the Cu alloy matrix can not be obtained. When the Sn content exceeds 15 mass %, the matrix becomes brittle.

(2) Inorganic Compound Particles

When an amount of inorganic compound particles is less than 0.2 mass %, an average distance between the inorganic compound particles dispersed in the Cu alloy matrix exceeds 50 µm. Then, the Cu alloy matrix existing among the inorganic compound particles becomes difficult to be affected by a difference of thermal expansion between the Cu alloy matrix and the inorganic compound particles. Accordingly, an oxide film and a sulfide film become difficult to be formed on the whole surface of the Cu alloy matrix. On the other hand, when the amount of the inorganic compound particles exceeds 5 mass %, the inorganic compound particles tend to easily locally aggregate in the Cu alloy matrix, and the average distance between the inorganic compound particles exceeds 50 µm. Thus, the oxide film and the sulfide film become difficult to be formed on the whole surface of the Cu alloy matrix.

(3) Average Particle Size of Inorganic Compound Particles

When the average particle size of the inorganic compound particles is less than 1 µm, the inorganic compound particles are excessively fine, and a defect (distortion) does not likely to occur in an array of metal atoms of the Cu alloy matrix in a periphery of the inorganic compound particles, due to the difference of thermal expansion between the Cu alloy matrix and the inorganic compound particles. Thus, the Cu alloy matrix does not likely to react with oxygen and sulfur in a lubricating oil, and thus seizure resistance is lowered. On the other hand, when the average particle size of the inorganic compound particles exceeds 10 µm, a contact of the inorganic compound particles with an opposing axis generates heat, and an amount of the defects (distortion) in the Cu alloy matrix in the periphery of the inorganic compound particles increases. Therefore, the oxide film and the sulfide film become locally thick and fracture occurs. Furthermore, in a portion at which the fracture has occurred, a metal of the Cu alloy matrix is exposed, and accordingly the seizure resistance is lowered.

(4) Ratio of True Density

A ratio of true density of the Cu alloy matrix in relation to that of the inorganic compound particles is expressed by following expression (true density of Cu alloy matrix/true density of inorganic compound particle).

When the ratio of true density becomes 0.6 to 1.4, the true density of the Cu alloy matrix is close to that of the inorganic compound particles, and the dispersion of the inorganic compound particles in the Cu alloy matrix can be controlled. When the ratio of true density deviates from the range of 0.6 to 1.4, the difference of true densityies increases, and the inorganic compound particles are likely to cause aggregation and segregation.

(5) Ratio of Thermal Expansion Coefficient

A thermal expansion coefficient referred to in the specification means a value in a temperature range of 20 to 300° C., at which a slide bearing for an internal combustion engine is used. In addition, a ratio of thermal expansion coefficient of the Cu alloy matrix in relation to that of the inorganic compound particles is expressed by following expression (thermal expansion coefficient of Cu alloy matrix/thermal expansion coefficient of inorganic compound particle).

When the ratio of thermal expansion coefficient becomes 1.5 to 3.0, an uniform oxide film and sulfide film can be formed on the whole surface of the Cu alloy matrix. The ratio of thermal expansion coefficient is more preferably in a range of 1.9 to 2.6. When the ratio of thermal expansion coefficient is less than 1.5, only a periphery of the inorganic compound particles is affected by a difference of the thermal expansion, and accordingly the uniform oxide and sulfide films are not likely to be formed on the whole surface of the Cu alloy matrix. On the other hand, when the ratio of thermal expansion coefficient exceeds 3.0, the whole surface of the Cu alloy matrix is largely distorted, and accordingly the oxide and sulfide films are excessively formed. Since the oxide and sulfide films become thick, high stress is generated in the films and fracture occurs. Furthermore, in a portion at which the fracture has occurred, a metal of the Cu alloy matrix is exposed, and accordingly seizure resistance is lowered.

(6) Average Distance Between Inorganic Compound Particles

An average distance between inorganic compound particles referred to in the specification means an average distance between a surface of an inorganic compound particle in the Cu alloy matrix and a surface of other inorganic compound particle which is positioned closest to the inorganic compound particle. It represents an average length of the Cu alloy matrix existing between the inorganic compound particles. When the average distance between the inorganic compound particles exceeds 50 µm, the Cu alloy matrix in a vicinity of a center portion between the inorganic compound particles becomes difficult to be affected by the difference of thermal expansion between the Cu alloy matrix and the inorganic compound particle, and accordingly the oxide film and the sulfide film become difficult to be formed on the whole surface of the Cu alloy matrix. On the other hand, the lower limit of the average distance is defined to be 5 µm, that is the lowest limit confirmed in an experiment. It is desirable from a viewpoint of forming the oxide and sulfide films that the average distance between the inorganic compound particles is less than 5 µm. However, it requires that raw materials are to be manufactured with a special powder manufacturing method, such as a method of mechanically compounding inorganic compound particles and a Cu alloy powder, or with a manufacturing method other than the continuous sintering method shown in conventional arts, so that the copper-based sliding material becomes expensive.

The inorganic compound particles may be at least one compound of a metal carbide, a metal nitride, a metal silicide and a metal boride. The carbides may include NbC, TaC, $Mo_2C$ and $Cr_3C_2$. The nitrides may include ZrN, $Cr_2N$ and NbN. The silicides may include $TaSi_2$, $MoSi_2$, $Mo_5Si_3$ and $WSi_2$, and the borides may include $Mo_2B_5$, $VB_2$, CrB and $TaB_2$.

The Cu alloy layer may contain 0.1 to 30 mass % in total of at least one element of Bi and Pb, in order to improve sliding properties of the Cu alloy matrix. When the content is less than 0.1 mass %, the element/elements does/do not contribute to the sliding properties of the Cu alloy matrix. When the content exceeds 30 mass %, strength of the Cu alloy matrix decreases.

In addition, the Cu alloy layer may contain 0.1 to 40 mass % in total of at least one element selected from the group consisting of Ni, Zn, Fe, Ag and In, in order to improve strength of the Cu alloy matrix. When the content is less than 0.1 mass %, the Cu alloy matrix has insufficient strength. When the content exceeds 40 mass %, the Cu alloy matrix becomes brittle.

The Cu alloy layer may contain 0.01 to 0.5 mass % P, in order to strengthen the Cu alloy matrix. When these contents are less than 0.01 mass %, the Cu alloy matrix is insufficiently strengthened. When these contents exceed 0.5 mass %, the Cu alloy matrix becomes brittle.

DETAILED DESCRIPTION OF THE INVENTION

Figure 1:
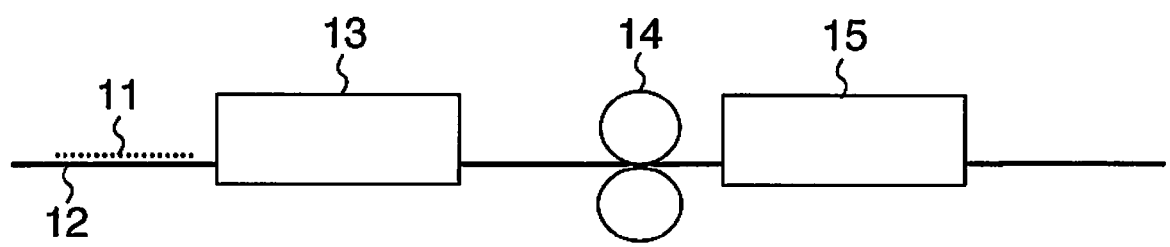
FIG. 1 is a drawing of a sintering step for producing a copper-based sliding material.
Figure 2A:
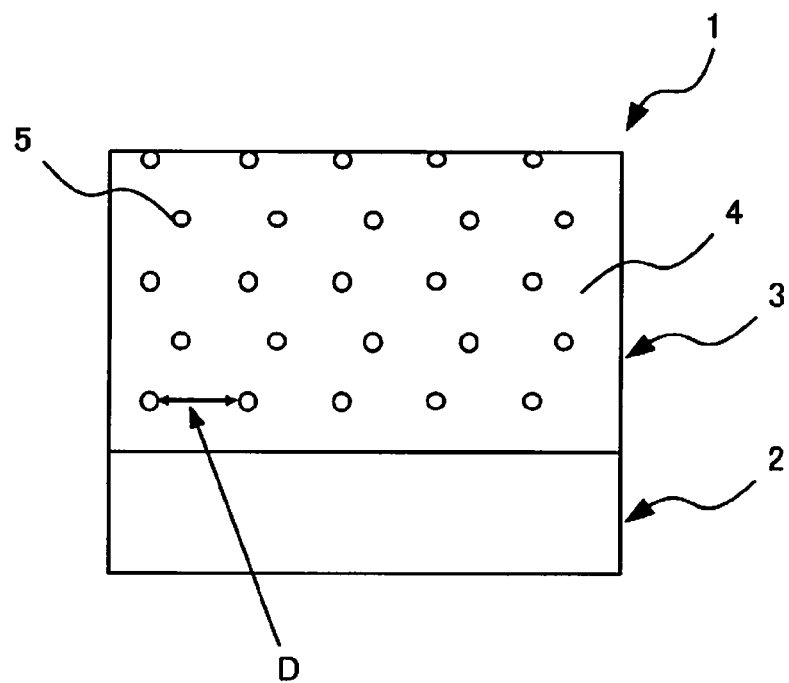
FIG. 2A is a schematic view illustrating a cross-sectional structure of a Cu alloy layer having inorganic compound particles dispersed in a Cu alloy matrix.
Figure 2B:
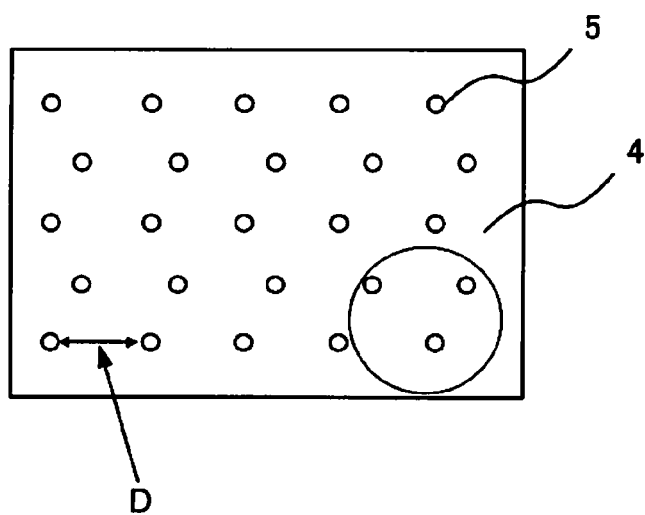
FIG. 2B is a schematic view illustrating a surface structure of the Cu alloy layer having the inorganic compound particles 5 dispersed in the Cu alloy matrix.
Figure 2C:
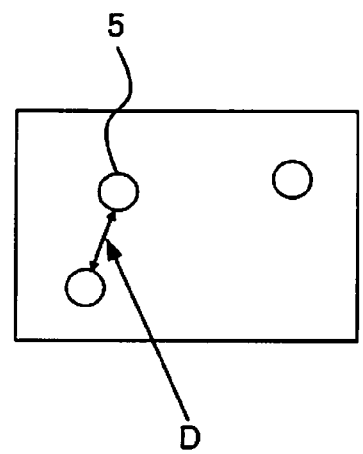
FIG. 2C is an enlarged view of a region enclosed by a circle in FIG. 2B.
Figure 3A:
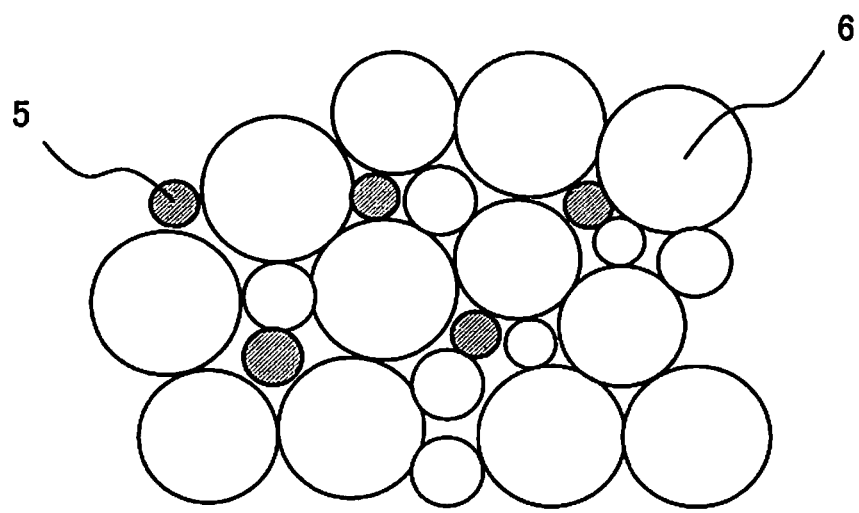
FIG. 3A is a view for describing a behavior of inorganic compound particles when a Cu alloy powder and the inorganic compound particles are mixed.
Figure 3B:
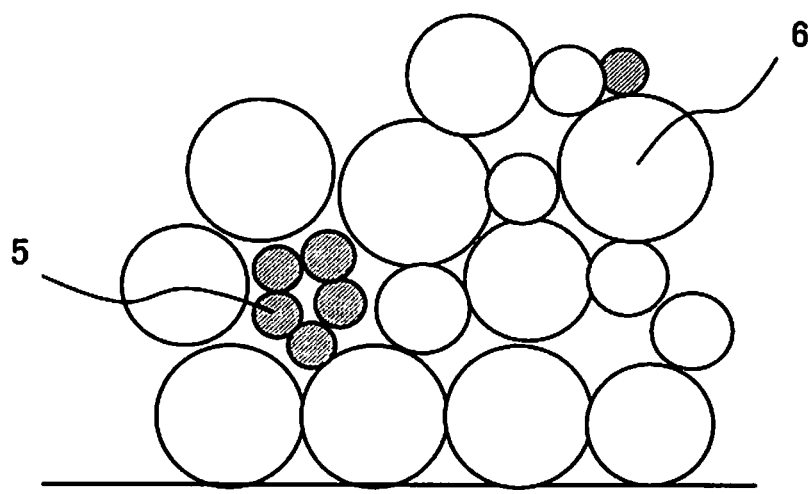
FIG. 3B is a view for describing a behavior of inorganic compound particles when the Cu alloy powder mixed with the inorganic compound particles is spread.

Embodiments of the invention will be described below with reference to FIGS. 1 to 3. FIG. 1 shows a sintering step for producing a copper-based sliding material 1. FIG. 2A is a schematic view illustrating a cross-sectional structure of a Cu alloy layer 3 having inorganic compound particles 5 dispersed in a Cu alloy matrix 4. FIGS. 2B and 2C are schematic views illustrating a surface structure of the Cu alloy layer 3 having the inorganic compound particles 5 dispersed in the Cu alloy matrix 4. FIG. 3A is a view for describing the behavior of the inorganic compound particles 5 when a Cu alloy powder 6 and the inorganic compound particles 5 are mixed. FIG. 3B is a view for describing the behavior of inorganic compound particles 5 when the Cu alloy powder 6 mixed with the inorganic compound particles 5 is spread.

Production methods of Examples 1 to 18 and Comparative Examples 21 to 30 are as follows. First, a Cu alloy powder 6 having a composition shown in Table 1 and inorganic compound particles 5 having a composition and an average particle size shown in Table 1 were mixed so that a ratio of the inorganic compound particles 5 takes a value in a column of "amount of inorganic compounds" in mass % of Table 1. In addition, Table 1 includes a ratio of true density of the Cu alloy matrix 4 in relation to that of the inorganic compound particles 5 in a column of "ratio of true density", and a ratio of thermal expansion coefficient of the Cu alloy matrix 4 in relation to that of the inorganic compound particles 5 in a column of "ratio of thermal expansion coefficient" for Examples 1 to 18 and Comparative Examples 21 to 30.

TABLE 1

| | No. | Composition of Cu alloy (mass %) | | | | | | | | | | Inorganic compound particle | | Ratio of true density | Ratio of thermal expansion coefficient |
| | | | Cu | Sn | Zn | Ni | Fe | Ag | In | P | Bi | Pb | Content (mass %) | Type | | |
| Example | 1 | Balance | 8 | — | — | — | — | — | — | — | — | — | 2.5 | $Mo_2B_5$ | 1.2 | 2.1 |
| | 2 | Balance | 8 | — | — | — | — | — | — | — | — | — | 5 | $Mo_2B_5$ | 1.2 | 2.1 |
| | 3 | Balance | 8 | — | — | — | — | — | — | — | — | — | 0.2 | $Mo_2B_5$ | 1.2 | 2.1 |
| | 4 | Balance | 8 | — | — | — | — | — | — | — | — | — | 2.5 | $Mo_2B_5$ | 1.2 | 2.1 |
| | 5 | Balance | 8 | — | — | — | — | — | — | — | — | — | 2.5 | $Mo_2B_5$ | 1.2 | 2.1 |
| | 6 | Balance | 8 | — | — | — | — | — | — | — | — | — | 2.5 | $WSi_2$ | 0.9 | 3.0 |
| | 7 | Balance | 8 | — | — | — | — | — | — | — | — | — | 2.5 | $Cr_3C_2$ | 1.3 | 1.5 |
| | 8 | Balance | 8 | — | — | — | — | — | — | — | — | — | 2.5 | $MoSi_2$ | 1.4 | 2.2 |
| | 9 | Balance | 8 | — | — | — | — | — | — | — | — | — | 2.5 | TaC | 0.6 | 2.5 |
| | 10 | Balance | 8 | — | — | — | — | — | — | — | — | — | 2.5 | TaC | 0.6 | 2.5 |
| | 11 | Balance | 8 | — | — | — | — | — | — | — | — | — | 2.5 | $Mo_2C$ | 1.0 | 2.3 |
| | 12 | Balance | 8 | — | — | — | — | — | — | — | — | — | 2.5 | $Mo_2B_5$ | 1.2 | 2.1 |
| | 13 | Balance | 8 | — | — | — | — | — | — | — | — | — | 2.5 | $Mo_2B_5$ | 1.2 | 2.1 |
| | 14 | Balance | 1 | 20 | 0.5 | 0.5 | 0.5 | 0.5 | — | — | — | — | 2.5 | $Mo_2B_5$ | 1.1 | 2.1 |
| | 15 | Balance | 8 | — | — | — | — | — | 0.2 | — | — | — | 2.5 | $Mo_2B_5$ | 1.2 | 2.1 |
| | 16 | Balance | 8 | — | — | — | — | — | — | 15 | — | — | 2.5 | ZrN | 1.2 | 2.5 |
| | 17 | Balance | 8 | — | — | — | — | — | — | — | 15 | — | 2.5 | ZrN | 1.2 | 2.5 |
| | 18 | Balance | 8 | — | — | — | — | — | — | — | — | — | 2.5 | $TaSi_2 + Mo_2C$ | 1.0 | 2.1 |
| Comparative Example | 21 | Balance | 8 | — | — | — | — | — | — | — | — | — | 0.1 | $Mo_2B_5$ | 1.2 | 2.1 |
| | 22 | Balance | 8 | — | — | — | — | — | — | — | — | — | 7.5 | $Mo_2B_5$ | 1.2 | 2.1 |
| | 23 | Balance | 8 | — | — | — | — | — | — | — | — | — | 2.5 | $Mo_2B_5$ | 1.2 | 2.1 |
| | 24 | Balance | 8 | — | — | — | — | — | — | — | — | — | 2.5 | $Mo_5Si_3$ | 1.1 | 4.2 |
| | 25 | Balance | 8 | — | — | — | — | — | — | — | — | — | 2.5 | CrB | 1.4 | 1.4 |
| | 26 | Balance | 8 | 20 | — | — | — | — | — | — | — | — | 2.5 | WC | 0.5 | 4.7 |
| | 27 | Balance | 8 | — | — | — | — | — | — | — | — | — | 2.5 | TiC | 1.8 | 2.3 |
| | 28 | Balance | 8 | — | — | — | — | — | — | — | — | — | 2.5 | $Mo_2B_5$ | 1.2 | 2.1 |
| | 29 | Balance | — | 30 | 5 | — | — | — | — | — | — | — | 2.5 | AlN | 2.5 | 4.0 |
| | 30 | Balance | 2 | — | 10 | — | — | — | — | — | — | — | 2.5 | $Mo_2C$ | 1.0 | 2.3 |

| | No. | Porosity (%) | Average particle size of inorganic compound particles (μm) | Average distance between particles (μm) | Area ratio of film (%) | Critical pressure for seizure (Mpa) |
| --- | --- | --- | --- | --- | --- | --- |
| Example | 1 | 45 | 5 | 30 | 84 | 33 |
| | 2 | 45 | 5 | 35 | 76 | 30 |
| | 3 | 45 | 5 | 40 | 72 | 27 |
| | 4 | 70 | 5 | 45 | 66 | 24 |
| | 5 | 20 | 5 | 10 | 100 | 36 |
| | 6 | 45 | 5 | 30 | 100 | 36 |
| | 7 | 45 | 5 | 35 | 76 | 27 |
| | 8 | 45 | 5 | 40 | 74 | 24 |
| | 9 | 45 | 5 | 40 | 74 | 24 |

TABLE 1-continued

|  |  |  |  |  |  |  |
|---|---|---|---|---|---|---|
|  | 10 | 70 | 5 | 50 | 60 | 21 |
|  | 11 | 20 | 5 | 5 | 100 | 39 |
|  | 12 | 45 | 10 | 45 | 66 | 21 |
|  | 13 | 45 | 1 | 10 | 76 | 30 |
|  | 14 | 45 | 5 | 30 | 84 | 33 |
|  | 15 | 45 | 5 | 30 | 84 | 33 |
|  | 16 | 45 | 5 | 30 | 84 | 36 |
|  | 17 | 45 | 5 | 30 | 84 | 36 |
|  | 18 | 45 | 5 | 25 | 88 | 36 |
| Comparative Example | 21 | 45 | 5 | 80 | 28 | 9 |
|  | 22 | 45 | 5 | 60 | 42 | 15 |
|  | 23 | 80 | 5 | 70 | 38 | 12 |
|  | 24 | 45 | 5 | 30 | 40 | 12 |
|  | 25 | 45 | 5 | 35 | 30 | 9 |
|  | 26 | 45 | 5 | 65 | 28 | 9 |
|  | 27 | 45 | 5 | 90 | 22 | 6 |
|  | 28 | 45 | 20 | 60 | 32 | 9 |
|  | 29 | 45 | 5 | 65 | 34 | 9 |
|  | 30 | 70 | 5 | 70 | 40 | 12 |

In addition, the Cu alloy powder 6 in Examples 1 to 18 and Comparative Examples 21 to 30 respectively had porosities shown in Table 1 when no pressure is applied. Specifically, the Cu alloy powder 6 (Comparative Example 23) having 80% of porosity had a particle size distribution that a maximum particle size is 75 μm or less and 90% or more of the particles have a size of 45 μm or less. The Cu alloy powder 6 (Examples 4 and 10 and Comparative Example 30) having a porosity of 70% had a particle size distribution that a maximum particle size is 106 μm or less and that 90% or more of the particles have a particle size of 75 μm or less, and 60% or more of the particles has a particle size of 45 μm or less. The Cu alloy powder 6 (Examples 1 to 3, 6 to 9 and 12 to 18, and Comparative Examples 21, 22 and 24 to 29) having 45% of porosity had a particle size distribution that a maximum particle size is 150 μm or less and 50% or more of the particles has a particle size of 75 μm or less, and 30% or more of the particles has a particle size of 45 μm or less. The Cu alloy powder 6 (Examples 5 and 11) having a porosity of 20% had a particle size distribution that a maximum particle size is 150 μm or less and that 40% or more of the particles has a particle size of 75 μm or less, and 25% or less of the particles has a particle size of 45 μm or less.

The porosity of the Cu alloy powder 6 is calculated from following expression:

porosity=(1−bulk density/true density)×100.

The bulk density in the present embodiment can be obtained by using a measurement such as defined in ISO 3923-1 (JIS Z2504 in JIS standard).

Next, as is illustrated in FIG. 1, the mixture 11 of the Cu alloy powder 6 and the inorganic compound particles 5 was spread on a steel strip 12, and was subjected to primary sintering 13 in a reducing atmosphere and at a temperature of 750 to 970° C. for 10 to 30 minutes. Thus, a porous Cu alloy layer 3 was formed on the steel strip. Then, the porous Cu alloy layer 3 was rolled between rolls 14 so as to be densified, and was subjected to secondary sintering 15 under same temperature conditions as that of the primary sintering. Thereby, as illustrated in FIG. 2A, a copper-based sliding material 1 was produced, which includes a Cu alloy layer 3 containing inorganic compound particles 5 dispersed in a Cu alloy matrix 4 on a back metal layer 2 of steel. The temperatures of the primary and secondary sintering for Examples 1 to 18 and Comparative Examples 21 to 29 were determined such that the temperature exceed a solidus line and is lower than a liquidus line for the composition of the Cu alloy so that a liquid phase is partially generated (in a solid-liquid coexisting state) on a surface of the Cu alloy powder 6 when the Cu alloy powder was sintered. On the other hand, the temperature of the primary and secondary sintering for Comparative Example 30 were determined such that the temperature is lower than the solidus line for the composition of the Cu alloy and the liquid phase was not generated on the surface of the Cu alloy powder 6 when the Cu alloy powder was sintered.

An average distance "D" between the inorganic compound particles 5 dispersed in the Cu alloy matrix 4 in the Cu alloy layer 3 was measured and the result is illustrated in Table 1. The average distance between the inorganic compound particles 5 is an average distance between a surface of one inorganic compound particle 5 dispersed in the Cu alloy matrix 4 and a surface of other closest inorganic compound particle 5, and thus represents an average length of the Cu alloy matrix 4 existing between the inorganic compound particles 5, as is illustrated in an enlarged view of FIG. 2C. This average distance was measured by taking a photograph of a composition image of the Cu alloy layer 3 with a magnification of 500 times by using an electron microscope, and by using a general image analysis technique (analysis software: Image-ProPlus (Version 4.5); made by Planetron, Inc.) for the composition image. In addition, it was confirmed that the same average distance was obtained even when it was measured in a cross section of the Cu alloy layer 3 illustrated in FIG. 2A or in a surface of the Cu alloy layer 3 illustrated in FIG. 2B. Thus, the measurements in the cross section in a direction perpendicular to the surface (sliding face) of the Cu alloy layer 3 were used.

When a plurality of inorganic compound particles 5 were locally segregated (aggregated) in the Cu alloy matrix, the "average distance between particles" in the embodiment was measured by regarding each segregation (aggregation) portion as one inorganic compound particle 5. In other words, the segregation (aggregation) portion of the inorganic compound particles 5 means a state in which surfaces of the plurality of the inorganic compound particles 5 come in contact with each other.

The copper-based sliding materials 1 in Examples 1 to 18 and Comparative Examples 21 to 30 were worked into cylindrical slide bearings, and were subjected to a test of protective film under conditions shown in Table 2. Evaluation was made by measuring a ratio of black or brown colored area due to sulfidation or oxidation in relation to the whole sliding surface. The result is shown in the column of "area ratio of film" of Table 1. In addition, a seizure test was conducted under conditions shown in Table 3. For evaluation, it was determined that the seizure has occurred when a temperature of a back face of the slide bearing reached 230° C. A critical load (contact pressure) at which the seizure has not occurred is shown in the column of "critical pressure for seizure" of Table 1.

TABLE 2

| Test method | Bush test |
| --- | --- |
| Inner diameter of bearing | 20 mm |
| Circumferential velocity | 10 m/s |
| Load | 1 MPa |
| Lubricating oil | Diesel engine oil |
| Temperature of lubricating oil | 140° C. |
| Test period of time | 1 hour |

TABLE 3

| Test method | Bush test |
| --- | --- |
| Inner diameter of bearing | 20 mm |
| Circumferential velocity | 12 m/s |
| Loa | Cumulative load (3 MPa/10 min) |
| Lubricating oil | Diesel engine oil |
| Temperature of lubricating oil | 110° C. |

The oxide film and the sulfide film are formed on 60% or more of a surface of the Cu alloy matrix 4 in a sliding face of the copper-based sliding material 1 of Examples 1 to 18. With respect to the seizure test, good results are obtained in comparison with Comparative Examples 21 to 30. On the other hand, Comparative Examples 21 to 30 have a metallic gloss portion remaining in a half or more of the sliding face, which means that the oxide film and the sulfide film are not sufficiently formed on the surface of the Cu alloy matrix 4, and good results are not obtained in the seizure test.

Examples 2 and 3 and Comparative Examples 21 and 22 include varied amount of the inorganic compound particles 5 from that of Example 1. Since Examples 1 to 3 include 0.2 to 5 mass % of the inorganic compound particles 5, the oxide film and the sulfide film are more likely to be formed on the surface of the Cu alloy matrix 4, and accordingly better seizure resistance is obtained than those of Comparative Examples 21 and 22. Particularly, in Example 1 out of Examples 1 to 3, the inorganic compound particles 5 are little aggregated and segregated, and the average distance between the inorganic compound particles 5 becomes small. Accordingly, high seizure resistance is obtained. On the other hand, in Comparative Example 21, an amount of the inorganic compound particles 5 is less than 0.2 mass %, and the average distance between the inorganic compound particles 5 becomes greater. Accordingly, the Cu alloy matrix 4 becomes difficult to be distorted by the difference of thermal expansion between the Cu alloy matrix 4 and the inorganic compound particles 5. Thus, the oxide film and the sulfide film are not uniformly formed on the surface of the Cu alloy matrix 4, and the seizure resistance is low. In addition, in Comparative Example 22, an amount of the inorganic compound particles 5 exceeds 5 mass %. The inorganic compound particles 5 aggregate, and the average distance between the inorganic compound particles 5 becomes greater. Accordingly, the oxide film and the sulfide film become difficult to be formed on the surface of the Cu alloy matrix 4, and the seizure resistance is low.

Examples 4 and 5 and Comparative Example 23 have varied porosities of the Cu alloy powder 6 from that in Example 1. Examples 1, 4 and 5 have the porosities in a range of 20 to 70%. Thereby, the average distance between the inorganic compound particles 5 becomes small, and accordingly the seizure resistance is more excellent than that of Comparative Example 23. Particularly, in Example 5 out of Examples 1, 4 and 5, the oxide film and the sulfide film become more likely to be formed on the surface of the Cu alloy matrix 4 and the seizure resistance is excellent, since the porosities of the Cu alloy powder 6 is small and the dispersibility of the inorganic compound particles 5 becomes better. On the other hand, the Cu alloy powder 6 used in Comparative Example 23 has the porosity which is intentionally deviated from a range of 20 to 70%. However, when the porosity of the Cu alloy powder 6 is large, even though the inorganic compound particles 5 are dispersed when mixed with the Cu alloy powder 6 as is illustrated in FIG. 3A, the inorganic compound particles 5 flow and tend to cause segregation and aggregation when the Cu alloy powder 6 is spread as illustrated in FIG. 3B. Thereby, the average distance between the inorganic compound particles 5 becomes great, and accordingly the oxide film and the sulfide film become difficult to be formed on the surface of the Cu alloy matrix 4. Thus, the seizure resistance is low.

Examples 6 and 7 and Comparative Examples 24 and 25 have varied ratios of thermal expansion coefficient of the Cu alloy matrix 4 in relation to that of the inorganic compound particles 5 from that of Example 1. Examples 1, 6 and 7 have the ratio of thermal expansion coefficient in a range of 1.5 to 3.0, thereby making the oxide film and the sulfide film formed on the surface of the Cu alloy matrix 4. Accordingly, they have more excellent seizure resistance than those of Comparative Examples 24 and 25. On the other hand, since Comparative Example 24 has the ratio of thermal expansion coefficient exceeding 3.0, the whole surface of the Cu alloy matrix 4 is largely distorted, and accordingly the oxide film and the sulfide film are excessively formed. Thereby, the formation and exfoliation of the oxide film and the sulfide film are repeated on the surface of the Cu alloy matrix 4, and the surface of the Cu alloy layer 3 becomes rough. Thus, an oil film can not be stably secured and the seizure resistance is low. In addition, Comparative Example 25 has the ratio of thermal expansion coefficient less than 1.5, and the Cu alloy matrix 4 is difficult to be distorted by the difference of thermal expansion between the Cu alloy matrix 4 and the inorganic compound particles 5. Accordingly, the oxide film and the sulfide film are not uniformly formed on the surface of the Cu alloy matrix 4 and the seizure resistance is low.

Examples 8 and 9 and Comparative Examples 26 and 27 have varied ratios of true density of the Cu alloy matrix 4 in relation to that of the inorganic compound particles 5 from that in Example 1. Examples 1, 8 and 9 have the ratio of true density in a range of 0.6 to 1.4, and thereby the average distance between the inorganic compound particles 5 becomes small. Accordingly, the oxide film and the sulfide film become easy to be formed on the surface of the Cu alloy matrix 4, and the seizure resistances are more excellent than those of Comparative Examples 26 and 27. On the other hand, since Comparative Examples 26 and 27 have the ratios of true density deviate from a range of 0.6 to 1.4, the inorganic compound particles 5 result in causing segregation and aggregation, and the average distance between the inorganic compound particles 5 becomes great. Accordingly, the oxide film and the sulfide film become difficult to be formed on the surface of the Cu alloy matrix 4, and the seizure resistance is low.

Examples 10 and 11 have varied distances between the inorganic compound particles 5 from that in Example 1. Example 10 has a large porosity of the Cu alloy powder 6 and the ratio of true density of the Cu alloy matrix 4 in relation to that of the inorganic compound particles 5 is a lowest value in a range of 0.6 to 1.4. Thereby, the distance between the inorganic compound particles 5 takes an upper value in a range of 5 to 50 μm. However, the oxide film and the sulfide film are formed on the surface of the Cu alloy matrix 4, and the seizure resistance is good. In addition, Example 11 has a small porosity of the Cu alloy powder 6 and the ratio of true density of the Cu alloy matrix 4 in relation to that of the inorganic compound particles 5 takes a median value in a range of 0.6 to 1.4, and thereby the distance between the inorganic compound particles 5 takes the lowest value in the a range of 5 to 50 μm. However, the oxide film and the sulfide film tend to be more easily formed than those in Example 10, and the seizure resistance is further excellent.

Examples 12 and 13 and Comparative Example 28 have varied average particle size of the inorganic compound particles 5 from that in Example 1. Examples 12 and 13 include the inorganic compound particles 5 having the average particle size in a range of 1 to 10 μm. Thereby, the oxide film and the sulfide film are formed on the surface of the Cu alloy matrix 4, and the seizure resistance is adequate. On the other hand, Comparative Example 28 has the average particle size of the inorganic compound particles 5 exceeding 10 μm. Thus, a generated heat due to a contact of the inorganic compound particles 5 with an opposing axis increases, and an amount of defects (distortion) of the Cu alloy matrix 4 in the periphery of the inorganic compound particles 5 increases. Therefore, the oxide film and the sulfide film become locally thick and tend to cause a fracture, and thus the seizure resistance is low.

A composition of Example 14 is such that Ni, Zn, Fe, Ag and In are added to the composition of Example 1, and a composition of Example 15 is such that P is added to the composition of Example 1, in order to strengthen the Cu alloy matrices 4. The seizure resistance is adequate.

A composition of Example 16 is such that Bi is added to the composition of Example 1, and a composition of Example 17 is such that Pb is added to the composition of Example 1, in order to improve lubricity of the Cu alloy matrix 4. The seizure resistance is adequate.

In Example 18, two types inorganic compound particles 5, $TaSi_2$ and $Mo_2C$, are added to the Cu alloy at a ratio of 1:1. The two types of inorganic compound particles is such that the ratio of thermal expansion coefficient of the Cu alloy matrix 4 in relation to that of the inorganic compound particles 5 is in a range of 1.5 to 3.0. The seizure resistance is adequate.

In Comparative Example 29, AlN is added to the Cu alloy as the inorganic compound particle 5. However, the ratio of thermal expansion coefficient of the Cu alloy matrix 4 in relation to that of the inorganic compound particles 5 exceeds 3.0, and the whole surface of the Cu alloy matrix 4 is largely distorted. Accordingly, the oxide film and the sulfide film are excessively formed. Thereby, formation and exfoliation of the oxide film and the sulfide film are repeated on the surface of the Cu alloy matrix 4, and the surface of the Cu alloy layer 3 becomes rough. Thus, an oil film can not be stably secured and the seizure resistance is low.

In Comparative Example 30, the primary sintering and the secondary sintering were conducted at a temperature lower than the solidus line of the composition of the Cu alloy. Thus, the inorganic compound particles 5 are not bonded to the surface of the Cu alloy powder 6, and segregation and aggregation tend to easily occur in a void portion of the porous Cu alloy layer 3. Therefore, the copper-based sliding material 1 necessarily has a large average distance between the inorganic compound particles 5. In addition, it was also proved that, when the Cu alloy layer 3 was sintered in the primary sintering and the secondary sintering at a temperature lower than the solidus line of the composition of the Cu alloy, a grain size in the Cu alloy matrix 4 of the Cu alloy layer 3 was excessively fine, and a protective film (oxide film and sulfide film) was difficult to be formed on the surface of the Cu alloy matrix 4. It is considered that, since the grain size in the Cu alloy matrix 4 of the Cu alloy layer 3 in Comparative Example 30 is excessively fine, a ratio of area of a grain boundary increases on the surface of the Cu alloy layer 3, and sulfidation and oxidation occur preferentially in the grain boundary, so that the protective film (oxide film and sulfide film) is hindered from being formed on the surface of the Cu alloy matrix 4.

A copper-based sliding material 1 according to the embodiment can be used as a slide bearing for an internal combustion engine or a slide bearing material of various industrial machines. In addition, the copper-based sliding material 1 according to the embodiment may also be used as a multilayer bearing having an overlay layer on the surface of the Cu alloy layer 3.

The invention claimed is:

1. A sliding material comprising
   a steel back metal layer, and
   a Cu alloy layer comprising 0.5 to 15 mass % of Sn, 0.2 to 5 mass % of inorganic compound particles, and the balance being Cu and unavoidable impurities,
   wherein the inorganic compound particles are dispersed in a Cu alloy matrix, and the inorganic compound particles have an average size in a range of 1 to 10 μm,
   wherein a ratio of true density of the Cu alloy matrix in relation to that of the inorganic compound particles is in a range of 0.6 to 1.4, and a ratio of thermal expansion coefficient at 20 to 300° C. of the Cu alloy matrix in relation to that of the inorganic compound particles is in a range of 1.5 to 3.0, and
   wherein an average distance between the inorganic compound particles dispersed in the Cu alloy matrix is in a range of 5 to 50 μm.

2. The sliding material according to claim 1, wherein the inorganic compound particles comprises at least one of a metal carbide, a metal nitride, a metal silicide and a metal boride.

3. The sliding material according to claim 1, wherein the Cu alloy layer further comprises 0.1 to 30 mass % in total of at least one element of Bi and Pb.

4. The sliding material according to claim 3, wherein the Cu alloy layer further comprises 0.1 to 40 mass % in total of at least one element from the group consisting of Ni, Zn, Fe, Ag and In.

5. The sliding material according to claim 4, wherein the Cu alloy layer further comprises 0.01 to 0.5 mass % of P.

6. The sliding material according to claim 3, wherein the Cu alloy layer further comprises 0.01 to 0.5 mass % of P.

7. The sliding material according to claim 1, wherein the Cu alloy layer further comprises 0.1 to 40 mass % in total of at least one element from the group consisting of Ni, Zn, Fe, Ag and In.

8. The sliding material according to claim 7, wherein the Cu alloy layer further comprises 0.01 to 0.5 mass % of P.

9. The sliding material according to claim 1, wherein the Cu alloy layer further comprises, 0.01 to 0.5 mass % of P.

* * * * *